United States Patent Office 2,996,494

Patented Aug. 15, 1961

2,996,494

OLEFIN POLYMERIZATION CATALYSTS CONTAINING ALKALI METAL TETRAPHENYLBORATE, ALUMINUM CHLORIDE AND TRANSITION ELEMENT COMPOUNDS

George O. Cash, Jr., Kingsport, Tenn., assignor to Eastman Kodak Company, Rochester, N.Y., a corporation of New Jersey No Drawing. Filed Nov. 6, 1958, Ser. No. 772,195
6 Claims. (Cl. 260—93.7)

This invention relates to the catalytic polymerization of α-monoolefins to high molecular weight, highly crystalline solid polymers. In a specific aspect this invention relates to the polymerization of ethylene, propylene or mixtures thereof to form solid, high density, highly crystalline polymers.

For many years, the Friedel-Crafts type of catalysts, such as aluminum chloride and boron trifluoride, were used to polymerize olefins to form low molecular weight, liquid polymers. Until recently, the commercial production of solid polyethylene was limited to the extremely high pressure process disclosed by Fawcett et al. in U.S. 2,153,553 wherein it was disclosed that ethylene could be polymerized to a solid waxy polymer by the use of pressures in excess of 500 atmospheres and usually of the order of 1000–2000 atmospheres. This high pressure polyethylene was characterized by a high degree of flexibility, good film forming properties and a waxy feel. Since such high pressure polyethylene possesses a rather high degree of chain branching, however, it also exhibits a relatively low softening temperature, a low density, and relatively low crystallinity.

In recent years it has been discovered that ethylene can be polymerized in the presence of catalysts consisting of either a supported oxide of chromium, molybdenum, tungsten or uranium activated by an alkali metal, or metal alkyls and metal alkyl halides, such as aluminum triethyl or ethyl aluminum chloride, in combination with a compound of a metal from the 4th to the 6th subgroups of the periodic table to produce high molecular weight solid polymers of ethylene which are characterized by a high density, high crystallinity, improved melting point, and relatively greater rigidity than is characteristic of the high pressure polymers.

Thus, at the present time, the catalytic processes for preparing highly crystalline, high molecular weight solid polyolefins fall into two general categories, namely, those employing a metal oxide as catalyst and those employing a metal alkyl or alkyl metal halide together with an activator. The metal oxide catalysts are used on solid supports as a catalyst bed and are subject to plugging of the bed and coating and inactivation of the catalyst unless special precautions are taken to ensure solution of the polymer as it is formed. The metal alkyls and metal alkyl halides are expensive to prepare and are difficult to handle in commercial practice due to the fact that they ignite spontaneously on contact with air. It is therefore desirable to have a relatively simple catalyst system whereby ethylene and similar gaseous α-monoolefins can be converted to high molecular weight solid polymer without the concomitant formation of substantial amounts of low molecular weight, waxy or oily polymers at relatively low pressures and temperatures.

It is accordingly an object of this invention to provide a new and improved process for effecting conversion of normally gaseous α-monoolefins, such as ethylene or propylene, or mixtures thereof, to high molecular weight, highly crystalline solid polymers in high yield and without the concomitant formation of substantial amounts of low molecular weight waxy or liquid products. Another object of the invention is to provide a new and improved process for catalytic polymerization of ethylene and similar α-monoolefins of 2–10 carbon atoms to high density solid polymers employing catalyst combinations which are free of the objectionable handling problems characteristic of the pyrophoric catalysts heretofore employed. Another object of the invention is to facilitate the commercial manufacture of high density, highly crystalline ethylene polymers by providing an economical process which can be readily carried out at pressures as low as atmospheric pressure and at temperatures ranging from room temperature or lower to 300° C. in high yields. Another object of the invention is to provide a catalyst mixture which is highly effective for forming solid polyolefins. Other objects will be apparent from the description and claims which follow.

These and other objects are attained by means of this invention wherein it was found unexpectedly that the normally gaseous α-monoolefins, either singly or in admixture, could be converted in high yield to high molecular weight, highly crystalline solid polymers without the concomitant formation of substantial amounts of low molecular weight waxy or liquid polymers by effecting the polymerization in the presence of a catalytic mixture comprising an alkali metal tetraphenylborate, an aluminum halide and a compound of a transition element selected from the group consisting of titanium, zirconium, vanadium, chromium, molybdenum and tungsten, said compound being selected from the group consisting of the halides, the lower alkoxides and phenoxides. It has now been found that this combination of three compounds, no two of which together possesses utility for polymerizing olfins to yield low or high molecular weight liquid or solid polymers, gives results which are comparable to or better than the best catalytic processes known heretofore for making solid polymers of improved crystallinity, melting point, and rigidity. Furthermore, the catalyst components are readily prepared and are simple to handle in large scale manufacturing operations. The reason why the three-component mixture exhibits the high degree of catalytic activity is not readily understood and could not be predicted from the art wherein it is apparent that the catalytic activity is empirical and unpredictable. The specific nature of the catalyst combination embodying this invention is illustrated by the fact that a mixture of sodium tetraphenylborate and aluminum chloride is ineffective as a catalyst for forming high molecular weight crystalline polyolefins. A mixture of sodium tetraphenylborate and titanium tetrachloride and a mixture of aluminum chloride and titanium tetrachloride are similarly ineffective. An especially advantageous aspect of the simple three-component catalysts embodying this invention is that the desired solid polymer is not only formed in very high yield but that the concomitant formation of undesirable low molecular weight waxy or liquid polymer is markedly decreased.

The inventive process is carried out in liquid phase in an inert organic liquid, and preferably an inert liquid hydrocarbon vehicle, and the removal of catalyst is facilitated by operating below the melting point of the polymer. The process proceeds with excellent results over a relatively wide temperature range varying from −20° C. to 300° C. and particularly good results being obtained in the range of 40–160° C. The preferred temperature range is 50–150° C. The pressure can be varied as desired, with pressures as low as atmospheric pressure being operable. Generally speaking, however, it is desirable to employ a pressure in the range of 0–400 p.s.i.g. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and as a solvent for the solid polymerization products at the temperature of polymerization. The great increase in polymerization rate with increasing pressures makes the use of higher pressures desirable.

The invention is applicable for polymerizing any of the well-known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as n-butylene, isobutylene, 1-pentene, 1-decene, allylbenzene, styrene, vinylcyclohexane and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The catalyst mixtures embodying this invention have several important advantages over the prior art processes. For example, the rate of polymerization is much faster than is ordinarily achieved with catalysts known heretofore, and the same degree of polymerization can be achieved in a few hours using the present catalyst system as required several days heretofore. Another advantage of the invention is that relatively lower pressures can be used with pressures as low as atmospheric pressure being operable. Ordinarily, moderate pressures are employed, but the use of such pressures still allows considerable economy over the conventional high pressure processes which operate in the range of 1000–2000 atmospheres in most cases. Another advantage of the catalysts embodying this invention is the fact that they are safe to handle and can be used at lower concentration than most catalysts. A further important advantage is the high yield of solid high density polymer without the concomitant formation of substantial amounts of waxy, greasy or oily polymers.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. Since the catalyst mixture employed consists of components which are either readily soluble or readily dispersible in the organic liquid vehicles commonly employed, the uniformity of reaction can be readily controlled. The exact nature of the catalytic action between the components of the mixture is not wholly understood, and particularly the reason why the mixture has such greatly increased activity is not understood. The catalyst can be separated from the polymer by any of several methods. A convenient method is to wash the product in methanol, dissolve the polymer in a xylene-2-ethylhexanol mixture and reprecipitate the polymer by cooling the solution. The reprecipitated polymer is then filtered, heated with methanolic hydrochloric acid to remove unreacted metal and washed free of acid with methanol. Alternatively, the crude polymer can be washed with methanol, heated with dilute solutions of sodium hydroxide and methanol, and finally washed with methanol and water. Either sequence affords completely colorless polymer.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, thereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from −20° C. to 300° C. can be employed as desired, the usual process adapted for commercial production is carried out at a temperature in the range of from 50° C. to 150° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 10 to 400 p.s.i.g. obtained by pressuring the system with the monomer being polymerized. The amount of vehicle employed can be varied over rather wide limits with relation to the monomer and catalyst mixture. Best results are obtained using a concentration of catalyst of from about 0.1 to about 1% by weight in the vehicle, but concentrations up to 10% by weight and higher can be used, if desired. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. Higher concentrations of monomer ordinarily increase the rate of polymerization. Concentrations above 5–10% by weight are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, iso-octane, methyl cyclohexane, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

In the catalyst composition the weight ratio of alkali metal tetraphenylborate to aluminum halide is usually within the range of 15:1 to 1:1 preferably 10:1 to 3:1, and the weight ratio of aluminum halide to transition element compound is usually within the range of 0.1:1 to 3:1, preferably 0.5:1 to 2:1. Sodium tetraphenylborate is preferred in the catalyst composition, but similar compounds of potassium and lithium can be used. Aluminum chloride is also preferred in the catalyst compounds but aluminum bromide and aluminum iodide can be used. Among the transition element compounds that can be used are the chloride, bromide, iodide, methoxide, ethoxide, propoxide, butoxide, phenoxide, and the like, and it is preferred to use titanium tetrachloride. The transition element that is used can be at its maximum valence or in a reduced valence form.

The following examples are illustrative of this invention.

*Example 1*

A 300-ml. stainless steel autoclave was thoroughly dried and in a nitrogen-filled dry box, charged with 3.4 g. sodium tetraphenylborate, 0.3 g. aluminum chloride, 0.7 g. titanium tetrachloride and 100 ml. heptane. A pressure of 300 p.s.i.g. of ethylene was impressed on the autoclave and the temperature was raised to 50° C. The autoclave and contents were rocked under these conditions for eight hours. The autoclave was cooled, vented, and opened, and the contents were emptied into ethanol. The product was washed with dilute hydrochloric acid, water, then ethanol. The product, which weighed 42 g., was highly crystalline polyethylene of inherent viscosity 2.34, and density 0.956.

*Example 2*

The autoclave was charged with 1.0 g. of sodium tetraphenylborate, 0.2 g. of aluminum chloride, 0.5 g. of titanium tetrachloride $TiCl_4$. The mixture was heated in the autoclave at 100° C. for one hour. The autoclave was cooled to room temperature and 100 ml. of liquid propylene was charged. The temperature was raised to 90° C., and the autoclave was rocked for 12 hrs. When the autoclave was cooled and vented, 38 g. of polypropylene was obtained. Extraction of this product with heptane gave 28.5 g. of highly crystalline polypropylene having a density of 0.917 and inherent viscosity of 2.43.

*Example 3*

The procedure of Example 2 was repeated at a polymerization temperature of 120° C. with 100 ml. of 1-butene instead of propylene. The yield was 34 g. of polymer, which upon extraction gave 20.4 g. of highly crystalline poly-1-butene.

*Example 4*

The procedure of Example 2 was repeated except that 100 ml. of 3-methyl-1-butene was used and the polymerization temperature was 150° C. The yield was 33 g. of polymer which gave upon extraction 23 g. of highly crystalline poly-3-methyl-1-butene.

*Example 5*

The procedure of Example 2 was repeated except that a polymerization temperature of 110° C. was used with 100 ml. of 4-methyl-1-pentene. The yield was 36 g. of polymer which gave, upon extraction, 27 g. of highly crystalline poly-4-methyl-1-pentene.

*Example 6*

A thoroughly dried 500-ml. pressure bottle was charged with 1.5 g. of sodium tetraphenylborate, 0.5 g. of aluminum chloride, 0.5 g. of titanium tetrachloride and 100 ml. of heptane. This mixture was heated at 90° C. for one hour under nitrogen. The nitrogen was displaced by propylene and the pressure was raised to 30 p.s.i.g. by connecting the bottle to a reservoir which was maintained at 30 p.s.i.g. Pressure drops were replenished from the reservoir. The bottle and contents were shaken for six hours under these conditions. The product was isolated as in Example 1; 14 g. of polymer was obtained. Upon extraction of this product with heptane, 11.6 g. of highly crystalline polypropylene having a density of 0.918 and an inherent viscosity of 2.48 was obtained.

*Example 7*

The procedure of Example 6 was repeated at a polymerization temperature of 70° C. and a pressure of 40 p.s.i.g. The yield was 18 g. of polymer from which 14 g. of highly crystalline polypropylene was obtained.

*Example 8*

A 3-l. flask equipped with a stirrer, condenser, and heating mantle was charged with 3.5 g. of sodium tetraphenylborate, 1.3 g. of aluminum chloride, 2.0 g. of titanium tetrachloride and 1.5 l. of dry heptane. The temperature was raised to 90° C., the stirrer was started, and propylene was bubbled into the mixture at a rate of 50 ml. (S.T.P.) per minute. At the end of 10 hrs. the gas was stopped, and the reaction mixture was filtered while hot. The product caught on the filter was 13 g. of highly crystalline polypropylene having a density of 0.919 and inherent viscosity of 2.57.

*Example 9*

The procedure of Example 8 was repeated except that 100 ml. of 4-methyl-1-pentene was added dropwise to the hot catalyst mixture from a dropping funnel. The product which was isolated as in Example 3 weighed 19 g. and was highly crystalline poly-4-methyl-1-pentene.

*Example 10*

The procedure of Example 6 was repeated except that 0.7 g. of vanadium tetrachloride was used instead of the titanium tetrachloride. The yield was 12 g. of polymer from which 8.2 g. of highly crystalline polypropylene was obtained by extraction.

*Example 11*

The procedure of Example 6 was repeated except that 0.4 g. of anhydrous chromium trichloride was used instead of the titanium tetrachloride. The yield was 7 g. of highly crystalline polypropylene.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

I claim:

1. The process for polymerizing a normally gaseous α-monoolefin to solid high molecular weight, crystalline polymer which comprises contacting said α-monoolefin with a catalytic mixture consisting essentially of sodium tetraphenylborate, aluminum chloride and a halide of a transition metal selected from the group consisting of titanium, vanadium and chromium at a temperature within the range of —20° C. to 300° C., the weight ratio of sodium tetraphenylborate to aluminum chloride in said catalytic mixture being within the range of 15:1 to 1:1 and the weight ratio of aluminum chloride to transition metal halide in said catalytic mixture being within the range of 0.1:1 to 3:1.

2. The process according to claim 1 wherein the polymerization reaction is effected at a pressure of 0–400 p.s.i.g.

3. The process for polymerizing ethylene to form a high molecular weight highly crystalline solid polymer which comprises contacting ethylene with a catalytic mixture consisting essentially of sodium tetraphenylborate, aluminum chloride and titanium tetrachloride in an inert liquid hydrocarbon at a temperature of 50 to 150° C. and a pressure of 0 to 400 p.s.i.g., the weight ratio of sodium tetraphenylborate to aluminum chloride in said catalytic mixture being within the range of 15:1 to 1:1 and the weight ratio of aluminum chloride to titanium tetrachloride in said catalytic mixture being within the range of 0.1:1 to 3:1.

4. The process for polymerizing propylene to form a high molecular weight highly crystalline solid polymer which comprises contacting propylene with a catalytic mixture consisting essentially of sodium tetraphenylborate, aluminum chloride and titanium tetrachloride in an inert liquid hydrocarbon at a temperature of 50 to 150° C. and a pressure of 0 to 400 p.s.i.g., the weight ratio of sodium tetraphenylborate to aluminum chloride in said catalytic mixture being within the range of 15:1 to 1:1 and the weight ratio of aluminum chloride to titanium tetrachloride in said catalytic mixture being within the range of 0.1:1 to 3:1.

5. As a composition of matter, a catalyst for the polymerization of α-monoolefinic hydrocarbons to solid high molecular weight crystalline polymer, said catalyst consisting essentially of sodium tetraphenylborate, aluminum chloride and a halide of a transition metal selected from the group consisting of titanium, vanadium and chromium, the weight ratio of sodium tetraphenylborate to aluminum chloride being within the range of 15:1 to 1:1 and the weight ratio of aluminum chloride to transition metal halide being within the range of 0.1:1 to 3:1.

6. As a composition of matter, a catalyst for the polymerization of ethylene to solid high molecular weight crystalline polymer, said catalyst consisting essentially of sodium tetraphenylborate, aluminum chloride and titanium tetrachloride, the weight ratio of sodium tetraphenylborate to aluminum chloride being within the range of 15:1 to 1:1 and the weight ratio of aluminum chloride to titanium tetrachloride being within the range of 0.1:1 to 3:1.

References Cited in the file of this patent

UNITED STATES PATENTS

| | | |
|---|---|---|
| 2,728,757 | Field et al. | Dec. 27, 1955 |
| 2,728,758 | Field et al. | Dec. 27, 1955 |
| 2,840,551 | Field et al. | June 24, 1958 |
| 2,846,427 | Findlay | Aug. 5, 1958 |

FOREIGN PATENTS

| | | |
|---|---|---|
| 1,134,740 | France | Dec. 3, 1956 |
| 1,160,864 | France | Mar. 10, 1958 |
| 1,161,213 | France | Mar. 17, 1958 |
| 567,399 | Belgium | May 5, 1958 |
| 543,941 | Belgium | June 6, 1956 |

OTHER REFERENCES

Coates: Organo-metallic Compounds, Wiley & Sons, Inc. (N.Y.), 1956, pages 69, 70.